United States Patent [19]

Ray-Chaudhuri et al.

[11] 4,268,656

[45] May 19, 1981

[54] CO-CURING AGENTS FOR EPOXY RESINS

[75] Inventors: Dilip K. Ray-Chaudhuri, Bridgewater; Wen B. Chiao, Somerville; Jules E. Schoenberg, Scotch Plains, all of N.J.

[73] Assignee: National Starch and Chemical Corporation, Bridgewater, N.J.

[21] Appl. No.: 112,496

[22] Filed: Jan. 16, 1980

[51] Int. Cl.$^3$ .............................................. C08G 59/56
[52] U.S. Cl. .................................. 528/103; 525/507; 528/96; 528/98; 528/99; 528/111; 528/113; 528/341; 528/361; 528/365; 528/367; 528/407
[58] Field of Search ................ 528/96, 103, 111, 365, 528/407, 361, 367

[56] References Cited

U.S. PATENT DOCUMENTS

| | | | |
|---|---|---|---|
| 2,847,395 | 8/1958 | Wear | 260/47 |
| 3,386,955 | 6/1968 | Nawakowski et al. | 260/47 |
| 3,386,956 | 6/1968 | Nawakowski et al. | 260/47 |
| 3,391,113 | 7/1968 | Lopez et al. | 260/47 |
| 3,400,098 | 9/1968 | Parry | 260/37 |
| 3,547,885 | 12/1970 | Dante et al. | 260/47 |
| 3,562,215 | 2/1971 | Moore | 260/47 |
| 3,639,657 | 2/1972 | Moran et al. | 260/47 EN |
| 3,707,583 | 12/1972 | McKown | 260/837 |
| 3,756,984 | 9/1973 | Klaren et al. | 260/47 EC |
| 3,795,657 | 3/1974 | Howsam et al. | 260/47 EN |
| 3,839,281 | 10/1974 | Dreher | 260/47 EN |
| 3,894,113 | 7/1975 | Pagel | 260/836 |
| 4,066,625 | 1/1978 | Bolger | 260/59 R |
| 4,101,514 | 7/1978 | Thom | 528/109 |
| 4,152,285 | 5/1979 | Thomassen | 252/182 |
| 4,188,474 | 2/1980 | Waddill et al. | 528/111 |

*Primary Examiner*—Earl A. Nielsen
*Attorney, Agent, or Firm*—Edwin M. Szala; Margaret B. Kelley

[57] ABSTRACT

A N-substituted piperazine or N-substituted homopiperazine adduct with a polyepoxide is used as a co-curing agent in epoxy resin systems containing a polyepoxide and a known curing agent such as dicyandiamide, a carboxylic acid anhydride, or a dihydrazide. The preferred adducts have a ratio of epoxy groups to secondary amino groups of between 1.2:1 and 3:1. The preferred polyepoxides are polyglycidyl ethers of 4,4'-isopropylidenediphenol (bisphenol A). Suitable adducts are prepared from N-methyl-, N-(2-hydroxyethyl)-, N-octyl-, N-phenyl- and N-benzyl piperazine and N-methyl homopiperazine.

22 Claims, No Drawings

CO-CURING AGENTS FOR EPOXY RESINS

BACKGROUND OF THE INVENTION

This invention relates to novel unitary, storable, heat-curable epoxy resin systems and to the novel co-curing agents incorporated therein. It also relates to the process for preparing these novel co-curing agents by reacting a polyepoxide with a N-substituted piperazine or N-substituted homopiperazine to form an adduct. It further relates to the process for heat-curing epoxy resin systems containing a known curing agent, such as dicyandiamide or a carboxylic acid anhydride, and the novel co-curing agent to produce insoluble, infusible cured resin products.

The curing agents employed in the formulation of epoxy resins have a significant influence on the physical and chemical properties of the cured resins and the shelf life and/or pot life (working life) of the composition. As used herein, the terms "shelf life" and "pot life" refer to the resin system's storage stability at room temperature and elevated temperatures, respectively. Typical curing agents include aliphatic and aromatic amines, carboxylic acid anhydrides, mercaptans, amine-boron trifluoride complexes, dicyandiamide and dihydrazides. Unitary systems (one package) are desirable because they eliminate the additional mixing step before using, avoid the possibility that the consumer may use the incorrect amount of curing agent, and further avoid the need for complex packaging. Many of the known curing agents have drawbacks that limit their use in unitary systems.

Previous attempts to provide unitary systems have involved the use of amines as latent curing agents, i.e. curing agents which will be unreactive with epoxy resins at room temperature but which will react rapidly at elevated temperatures. Aliphatic amines cure (harden) too rapidly. Aromatic amines prolong the shelf life; however they require the use of much higher temperatures and longer cure times to effect the cure. Dicyandiamide (often called Dicy), dihydrazides, and boron trifluoride-ethylamine complexes are latent curing agents which give a shelf life of at least six months at room temperature. Unfortunately these curing agents suffer from a slow cure at elevated temperatures. Dicy, the most desirable latent curing agent because it gives the best strength properties, has a shelf life of over 1 year, but it requires 1 hour to cure at 170° C. and does not cure at all at 120° C.

In order to increase the curing rate and lower the curing temperature, co-curing agents (accelerators) are often added to epoxy resin systems containing Dicy. These accelerators usually are derivatized amines which are stable at room temperature but which decompose at elevated temperatures to release free amines which catalyze the curing.

Typical known accelerators include substituted ureas and bisureas, tetraalkyl guanidines, and imidazole adducts with mono- and polyepoxides as well as with polyepoxides and phenolic-novolac resins. 1,1'-(4-Methyl-m-phenylene)-bis-(3,3-dimethylurea) (see U.S. Pat. No. 3,386,956), when used in epoxy systems containing 10 parts Dicy and 10 parts of the urea, required 90 minutes to cure at 107° C. and had a shelf life of only 5 weeks. Tetramethyl guanidine (see U.S. Pat. No. 3,391,113), when used in epoxy systems containing 10 parts Dicy and 5 parts of the guanidine, required 10 minutes to cure at 110° C.; however the shelf life at room temperature was short and adding 1 part (o- or p-chloro)-benzoic acid only increased the shelf life from 2 to 7 days. The 2-ethyl-4-methyl imidazole adduct with the glycidyl polyether of 2,2-bis-(4-hydroxyphenyl)propane (see U.S. Pat. No. 3,756,984), when used in epoxy systems containing 5 parts Dicy and 3 parts of the adduct, required 10 minutes to cure at 180°–185° C. and 45–60 minutes to cure at 130° C. 3-(p-Chlorophenyl)-1,1-dimethylurea (see U.S. Pat. No. 3,894,113), when used in epoxy systems which were solid at room temperature and contained 24.5 parts of carboxylated acrylonitrilebutadiene elastomer (as a flexibilizer), 6.3 parts Dicy and 3.1 parts of the urea, required 60 minutes to cure at 125° C. The 2-methyl imidazole adduct with the diglycidyl ether of 2,2-bis-(4-hydroxyphenyl)propane and phenolic novolac resins (see U.S. Pat. No. 4,066,625), when used in epoxy systems containing 5 parts Dicy and 7 parts of the adduct, required 10 minutes to cure at 138° C.

Carboxylic acid anhydrides generally perform satisfactorily in epoxy resin systems at lower temperatures than Dicy; however they react very slowly and are generally unsuitable for use when a rapid cure is desired. The addition of co-curing agents, such as benzyldimethylamine, tris(dimethyl-amino-methyl)phenol or boron trifluorde-amine complexes, accelerates the cure; however the systems lack storage stability and in most cases must be used within 24 hours after the addition of the co-curing agent (accelerator) or else the mixture begins to cure under normal storage conditions. Dicyandiamide, when used as a co-curing agent in an epoxy resin system containing trimellitic anhydride (see U.S. Pat. No. 3,400,098), had a shelf life of only 2–3 days at 27° C. and a pot life of 1 day at 49° C.; the curing cycle ranged from 120 minutes at 93° C. to 15 minutes at 204° C. Phosphonium halides, e.g. ethyl triphenyl phosphonium iodide, when used as co-curing agents for epoxy systems containing hexahydrophthalic anhydride (see U.S. Pat. No. 3,547,885) accelerated the cure; however the systems are only stable in the absence of the polycarboxylic acid anhydrides.

Dihydrazides generally perform satisfactorily at temperatures in the range of 150°–175° C., requiring from 15 minutes to 2 hours to cure; they have a good shelf life and pot life. The addition of co-curing agents (activators), even in catalytic amounts, tends to destroy the shelf life. Some activators have been found which do not destroy the shelf life; however they substantially shorten the pot life. One such activator consists of equal parts of lead octoate and the reaction product of zinc octoate and diethylaminopropylamine (see U.S. Pat. No. 2,847,395).

Hence, the search continues for an ideal unitary epoxy resin system which will be stable for several months at room temperature and which will cure rapidly to give high performance products.

Accordingly, it is an object of the present invention to provide novel co-curing agents which will accelerate the curing rate of unitary, storable epoxy resin systems containing a known curing agent, such as Dicy, a carboxylic acid anhydride, or a dihydrazide, and lengthen or not seriously impair the shelf life and/or pot life.

It is a further object to provide a process for preparing and using these novel co-curing agents in unitary, storable epoxy resin systems and for forming insoluble, infusible resin products therefrom by heat-curing at elevated temperatures.

SUMMARY OF THE INVENTION

The above and related objects are achieved by the preparation of epoxy resin systems containing polyepoxides, a known epoxy curing agent, such as dicyandiamide, a carboxylic acid anhydride, or a dihydrazide, and a novel co-curing agent comprising an adduct of a N-substituted piperazine or N-substituted homopiperazine with a polyepoxide. The quantities in which the polyepoxide, curing agent, and co-curing agent are combined may be varied over a wide range and will depend, not only on the polyepoxide used, but also upon the curing agent selected. Preferably, the co-curing agent is added in amounts of from 0.05 to 20% by weight, based on the polyepoxide, preferably 0.5–10%. The systems are cured by heating at 50° to 250° C., preferably at 100°–180°, for a time varying from 120 minutes to 1 minute depending upon the temperature. Most have a shelf life of at least 10 days at 50° C., with the preferred dicyandiamide-containing system having a maximum pot life of 50 days at 50° C., the preferred carboxylic acid anhydride-containing system having a maximum pot life of 30 days at 50° C., and the preferred dihydrazide-containing system having a pot life of more than 30 days at 50° C.

The novel co-curing agents are prepared by mixing a N-substituted piperazine or N-substituted homopiperazine with a polyepoxide, preferably an aromatic polyepoxide such as the glycidyl polyethers prepared by the reaction of epichlorohydrin with 4'4-isopropylidenediphenol (bisphenol A), using amounts sufficient to provide at least 0.8 epoxy group per secondary amino group in the resulting adducts. The adducts are usually aged for several days at an elevated temperature before being ground and optionally screened.

DESCRIPTION OF THE PREFERRED EMBODIMENTS

In preparing the co-curing agents herein, which are adducts of N-substituted piperazine and N-substituted homopiperazine with polyepoxides, the piperazine or homopiperazine compound is reacted with the polyepoxide in a ratio sufficient to provide at least 0.8 epoxy group per secondary amino group in the resulting adduct. Preferably the ratio of epoxy to secondary amino groups is between 1.2:1 and 3:1.

Useful N-substituted piperazines are

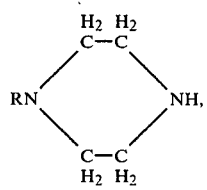

wherein R may be an alkyl, substituted alkyl, cycloalkyl, aryl or aralkyl group of up to 12 carbon atoms. Preferable piperazines include N-methyl, N-(2-hydroxyethyl), N-octyl, N-phenyl and N-benzyl piperazine. Useful N-substituted homopiperazines are

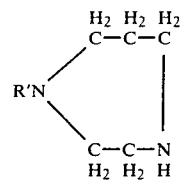

wherein R' is an alkyl group of up to 3 carbon atoms. N-Methyl homopiperazine is preferred.

As used herein, the term "piperazine" is intended to include both N-substituted piperazine and N-substituted homopiperazine and the term "polyepoxide" is intended to include compounds which contain on the average more than one vicinal epoxy group per molecule.

The preferred polyepoxides are the aromatic glycidyl polyethers formed by reacting an epihalohydrin with polyhydric phenols such as 4,4'-isopropylidenediphenol [also known as 2,2-bis(4-hydroxyphenyl)-propane], 4,4'-isopropylidenebis(2,6-dibromophenol), 1,1,3-tris(p-hydroxyphenyl)propane, 1,1-bis-(4-hydroxyphenyl)ethane, 1,1,2,2-tetra(p-hydroxyphenyl)ethane, bis-(4-hydroxyphenyl)methane, 4,4'-dihydroxydiphenyl sulphone, hydroquinone, resorcinol, dihydroxydiphenyl, dihydroxy naphthalene, phenol-formaldehyde novolac, p-aminophenol, and o-cresol-formaldehyde novolac.

Especially useful are the glycidyl polyethers prepared from epichlorohydrin and 4,4'-isopropylidenediphenol (bisphenol A) which have the general formula

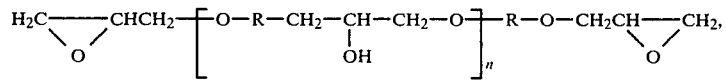

wherein R is the divalent hydrocarbon residue

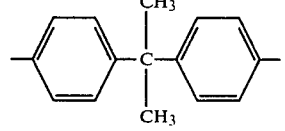

and n is a number up to 20. The molecular weight, softening point and viscosity generally depend on the ratio of epichlorohydrin to 4,4'-isopropylidenediphenol used in the preparation of the glycidyl polyether. When a large excess of epichlorohydrin is used, e.g. 10:1, the reaction product is usually a liquid with the viscosity depending on the value of n, typically n is between 0.1 and 0.6, and the molecular weight varying from 350 to 560. When the ratio of epichlorohydrin to 4,4'-isopropylidenediphenol is between 2:1 and 1:1, the reaction product is usually a solid at ambient temperature, with softening points between 50° and 170° C. and molecular weights from 770 to above 8,000. For the preparation of the adducts, the preferred glycidyl polyethers are those having a molecular weight of 350–1200 epoxide equivalent weight of 175–600, especially those having a molecular weight of 460–560 and epoxide equivalent weight of 230–280.

The epoxide equivalent weight, which is the value needed to select the proper weight ratio for the two components used in the preparation of the piperazine adduct, may be determined by reacting a sample of the polyepoxide with an excess of hydrochloric acid in dimethyl formamide and back-titrating the excess of hydrochloric acid with sodium hydroxide in methanol. Assuming a linear structure for the polyepoxide compound, the molecular weight is generally obtained by doubling the epoxide equivalent weight, i.e. grams of resin containing one gram equivalent of epoxide.

The co-curing agents, which are believed to be formed by an addition reaction involving the epoxy (i.e. oxirane) group and the secondary amine group, may be prepared by mixing the piperazine compound and polyepoxide using proportions which will provide the desired mole ratio of epoxy groups to amino groups in the resulting adduct. When the molar ratio of epoxy groups to secondary amino groups is below 1.2, the epoxy resin system containing the co-curing agent and known curing agent is relatively unstable and has a very limited pot life. When the molar ratio is above 3, the adduct does not as effectively accelerate the cure at low temperatures and it is somewhat less effective in accelerating the cure at higher temperatures.

The co-curing agent is prepared by mixing the piperazine compound and polyepoxide at room temperature. If desired the compounds may be mixed in the presence of other components normally used in epoxy resin systems (e.g. curing agents, plasticizers, diluents, etc.) provided the component will not react with the piperazine compound.

An exothermic reaction occurs which causes the temperature to rise as high as 130° C. It may be desirable to heat and to stir the resin in order to facilitate mixing and to control the uniformity of the reaction. The reaction mixture is maintained at an elevated temperature until the reaction is completed, generally about 30 minutes. The mixtures are usually aged at moderately elevated temperatures, up to 90° C. for a time which varies inversely with temperature, i.e. from 3 days to 1 hour. Preferably the adducts are aged for 3 days at 70° C. The reaction is considered as complete when further aging no longer changes the melting point of the adduct. The glassy and brittle adducts thus prepared are ground to a powder and, if necessary, screened to a small particle size to facilitate dispersion in the epoxy resin systems.

The polyepoxides which are required in the systems herein for conversion into insoluble, infusible products may be substituted or unsubstituted, aliphatic, cycloaliphatic, aromatic, or heterocyclic polyepoxides. They may be substituted with non-interfering substituents such as halogen, hydroxyl and ether groups. Especially useful are liquid and solid aromatic polyepoxides, such as glycidyl polyethers having an epoxide equivalent weight of 175–4000, preferably 175–1200.

A wide variety of aliphatic polyepoxides, in addition to the aromatic polyepoxides described hereinabove, may be used in the formulation of the epoxy resin system. Mixtures of polyepoxides are also suitable. These include the epoxidized esters of polyethylenically unsaturated monocarboxylic acids, such as epoxidized linseed and soybean oil; epoxidized esters of unsaturated monohydric alcohols and polycarboxylic acids, such as di-(2,3-epoxybutyl) adipate, phthalate, and tetrahydrophthalate; epoxidized esters of unsaturated alcohols and unsaturated carboxylic acids, such as 2,3-epoxybutyl-3,4-epoxypentanoate, 3-4-epoxycyclohexyl-3,4-epoxycyclohexanoate and 2,3-epoxycyclohexylmethyl-epoxycyclohexane carboxylate; epoxidized derivatives of polyethylenically unsaturated polycarboxylic acids, such as diethyl-5,6,10,11-diepoxyoctadecyl succinate, dibutyl-7,8,11,12-diepoxyoctadecanedioate and dibutyl-3-butyl-3,4,5,6-diepoxycylohexane-1,2-dicarboxylate; epoxidized polyesters obtained by reacting an unsaturated polyhydric alcohol and/or unsaturated polycarboxylic acid or anhydride, such as the polyesters obtained by reacting 8,9,12,13-eicosanedienedioic acid with ethylene glycol and 2-cyclohexene-1,4-dicarboxylic acid with diethylene glycol; epoxidized polyethylenically unsaturated hydrocarbons, such as epoxidized 2,2-bis-(2-cyclohexenyl) propane, epoxidized vinyl cyclohexene and epoxidized dimer of cyclopentadiene; epoxidized polymers of diolefins, such as butadiene and its copolymers with acrylonitrile and styrene; and glycidyl-containing nitrogen compounds, such as di- and triglycidylamine. All of the foregoing epoxy-containing materials, liquids as well as solids, are known in the art as epoxy resins. This is only a partial listing of the resins so designated and other polyepoxides may be useful as the compounds which are to be cured to insoluble, infusible resin products.

Polycarboxylic acid anhydrides suitable for use in unitary epoxy resin systems must form relatively stable mixtures at room temperature in the absence of a co-curing agent. Suitable anhydrides include succinic anhydride, dodecyl succinic anhydride, maleic anhydride, chlorendic anhydride, phthalic anhydride, tetrahydrophthalic anhydride, hexahydrophthalic anhydride, trimellitic anhydride, and pyromellitic dianhydride. Cyclopentanetetracarboxylic dianhydride, benzophenonetetracarboxylic dianhydride, bicyclo-(2.2.1)-heptene-2,3-dicarboxylic anhydride, methyl-bicyclo-(2.2.1)-heptene-2,3-dicarboxylic anhydride isomers, 1,4,5,6,7,7-hexachloro-bicyclo-(2.2.1)-5-heptene-2,3-dicarboxylic acid anhydride and partial esters thereof with ethylene glycol or glycerol may also be suitable. Mixed polycarboxylic acid anhydrides are also useful.

Dihydrazides suitable for use in unitary epoxy resin systems include azelayl, isophthayl, sebacyl, adipyl, succinyl, malonyl, oxalyl, and hexahydroterephthalyl dihydrazides and hydrazides containing other functional groups, such as p-hydroxybenzoylhydrazide, 5-amino-isophthalyl dihydrazide, p-aminobenzoylhydrazide, 3,5-diamino-benzoylhydrazide, etc.

These curing agents are generally employed in varying amounts, depending on the nature of the co-curing agent and equivalent weight of the polyepoxide. Dicyandiamide is generally used in a ratio of from 0.8 to 1.2 active hydrogen equivalents per epoxide equivalent. Typically from 5 to 10 parts per hundred are used. Polycarboxylic acid anhydrides are generally used in a ratio higher than 0.5, usually from 1.0 to 2.3 acid equivalents per epoxide. Typically from 45 to 120 parts per hundred are used. The preferred polycarboxylic acid anhydrides are 1,2-cyclohexane dicarboxylic acid anhydride, succinic anhydride, phthalic anhydride, and bicyclo(2.2.1)heptene-2,3-dicarboxylic anhydride. Dihydrazides are generally used in a ratio of 1 active hydrogen equivalent, i.e. 0.25 mole, per epoxide equivalent. When the (di)hydrazides contain other reactive groups, the amount used will depend upon the number of active hydrogens present in the compound.

Various modifying materials may be included in the epoxy resin systems of this invention. These include fillers, reinforcements, colorants, viscosity modifiers, flexibilizers, and plasticizers.

Fillers are used to modify the density and electrical conductivity, reduce shrinkage, improve heat resistance, alter surface hardness and improve adhesive properties. The fillers may be organic or inorganic, metallic or nonmetallic. Some of the commonly used fillers are carbon black; metal powders such as aluminum, copper and iron; metal oxides such as silica, titania and alumina; clays such as kaolin; silicates such as magnesium or aluminum silicate; asbestos; and phenolic resins.

Reinforcements are used to increase tensile, compressive, flexural and impact strength, to improve heat resistance, and to reduce shrinkage and thermal expansion. They are fibers in the form of cloth, mat, or chopped strands, such as glass, metal and nylon.

Colorants such as inorganic pigments or organic dyestuffs are added to change the color for esthetic reasons or for identification purposes. These include titanium dioxide, carbon black, National Fast Red or Bismark Brown.

Viscosity modifiers are added to improve the handling characteristics of the system. They include thixotropic agents, such as silica, polybutadienes, butadiene-acrylonitrile copolymers and styrene-butadiene copolymers and diluents such as toluene, xylene, dibutyl phthalate, triphenyl phosphite, and especially reactive diluents such as mono- and di-epoxides (e.g. butyl, hexyl, phenyl, p-xylyl and/or p-hexyl phenyl glycidyl ethers).

Flexibilizers and plasticizers, such as polyamides, polysulfides, polyesters, polyvinyl butyral, polybutadiene, butadiene acrylonitrile copolymers and epoxidized castor oil, may be added to impart peel strength, toughness, and impact resistance to the cured polyepoxide. These materials may or may not contain groups which are reactive to the polyepoxide.

In general, in forming the unitary, heat-curable epoxy resin systems of this invention the polyepoxide, curing agent, and co-curing agent may be mixed at room temperature. In the case of liquid resin systems, the use of diluent is optional. Suitable diluents were discussed hereinabove. The mono- and di-epoxy compounds used as diluents may take part in the curing reaction, and the amount used should be carefully selected so as to not adversely affect cure time and cure temperature.

In the case of solid resin systems, the curing agent and co-curing agent are preferably dry blended with the polyepoxide or gently heated with the polyepoxide at a temperature well below the curing temperature of that particular system.

The temperatures employed in the cure may vary from 50° to 250° C. The preferred epoxy resin systems begin to cure (gel) at between 100° and 180° C. over a period of time ranging from 60 minutes to slightly under 1 minute.

The epoxy resin systems of this invention are particularly useful as adhesives. They are known to have excellent properties and adhere to a wide variety of different materials such as wood, metal, glass, concrete, and plastics. Generally the surfaces of the materials to be bonded are cleaned in the known manner. Certain organic materials, such as thermoplastics, may require special surface treatments which are also well-known in the art. When the epoxy resin system is a solid, it may be applied as a powder or melted in a separate container, at a temperature below the curing temperature, and applied in the usual manner. A suitable curing time and temperature may be determined by a brief study of the effect of curing time and temperature on the tensile strength of the bond formed.

The epoxy resin systems of this invention may also be used to manufacture cured articles by impregnating or forming an article with the heat-curable epoxy resin system described hereinabove and then curing the article at an elevated temperature.

When making laminates, fibrous materials such as glass filaments or mats are impregnated with the composition. The impregnated material may be stored for some time before shaping and curing to provide the eventual laminate.

Castings and encapsulations of electrical equipment may be made using the compositions of this invention. The polyepoxide, curing agent, co-curing agent and optionally other additives are mixed, when necessary by gentle melting, and the liquid mixture is poured into the mold and cured at elevated temperatures.

Molded articles may also be made using the compositions of this invention. Solid polyepoxide, curing agent, co-curing agent and optionally other additives are mixed, when necessary by gentle melting, and the liquid mixture is poured into the mold and cured at elevated temperatures.

Powders prepared as described hereinabove for molding compounds may also be used for forming laminates by superimposing layers of glass mats (or other suitable fibrous substrates) and powder and then subjecting the composite to pressure and high temperature, so that the powder melts and is pressured into the fibrous substrate wherein it is cured.

Powders containing solid polyepoxides, curing agent, and co-curing agent, as described hereinabove, may also be used for powder coating using techniques such as fluidized bed coating or powder spray coating. For these applications, the powder and optional additives, such as pigments, fillers, anti-sagging agents and flow control agents, may be mixed by dry-blending, fusion-blending, or by combinations of the techniques described hereinabove for molding powders. The cooled solid mix may be ground using a pin disc mill or other suitable mill and sieved to provide a powder having the desired particle size, generally 45 mesh for fluidized bed equipment, between 200 and 45 mesh for electrostatic fluidized beds, and less than 200 mesh for electrostatic spraying (ASTM mesh values). The temperature in the fusion-blending is generally kept as low as possible to avoid cross-linking reactions, i.e. 40°–110° C. for a system containing a polyepoxide having a softening point of between 50° and 120° C. Extruders offer the advantage of very short fusion blending times and the capability of processing larger quantities.

The following examples will more fully illustrate the embodiments of this invention. In the examples, all parts are given by weight and all temperatures are in degrees Celsius unless otherwise noted.

EXAMPLE I

This example illustrates the preparation of various piperazine adducts and their use as a co-curing agent in epoxy systems.

Mixtures of various piperazine compounds and polyepoxides were stirred at room temperature. An exothermal reaction occurred which caused the temperature to rise to about 130° C. Stirring was continued for 30 minutes and the mixtures were then aged for 3 days at 70° C. The glassy and brittle adducts were ground and sieved through a 200 mesh screen. The polyepoxides used were the glycidyl polyethers marketed by Shell Chemical Co. under the trademark Epon ®. These are the glycidyl polyethers obtained by reacting epichlorohydrin with 4,4'-isopropylidenediphenol (bisphenol A).

| Grade | Epoxide Equivalent Weight | Epoxy Designation |
|---|---|---|
| Epon 828 | 185–192 | A |
| Epon 834 | 230–280 | B |
| Epon 1001 | 450–550 | C |

From 4 to 6 parts of the various piperazine adducts were added to systems containing 100 parts of Epoxy A and 8 parts of dicyandiamide (a latent curing agent). The epoxy systems were prepared by combining the components and then running the mixture through a three roll paint mill three times to achieve a finely ground dispersion.

The gel time (i.e. the length of time required for a sample to set) and storage stability (pot life) were determined. The results are summarized in Table I. The control, the Epoxy A-dicyandiamide system containing no piperazine adduct, did not gel at 120° C. and only gelled after 40 minutes at 160° C. The results show that the piperazine adducts acted as co-curing agents and accelerated the gelling rate at both temperatures.

EXAMPLE II

This example demonstrates that the piperazine adducts are unique in terms of gelling rate and storage stability. It also demonstrates that two nitrogen atoms must be present in the ring and that one of the nitrogens must be substituted. The preferred piperazine adduct, Epoxy B/N-methyl piperazine, was compared with piperidine, with an unsubstituted piperazine adduct and with several other secondary amine adducts. The epoxy systems were formulated as in Example I using 100 parts Epoxy A, 8 parts dicyandiamide, and 4 parts piperazine adduct. The gel time and storage stability were determined; the results are given in Table II.

EXAMPLE III

This example demonstrates that the preferred piperazine adducts should have a ratio of epoxy to secondary amino groups of at least 0.8:1, preferably between 1.2:1 and 3:1.

TABLE I

| Adduct Epoxy/Amine | Ratio of Epoxy to Secondary Amino Groups | Parts | Melting Point (°C.) | Gel Time 120° C. (min.) | Gel Time 160° C. (sec.) | Storage Stability at 50° C. (day) |
|---|---|---|---|---|---|---|
| Epoxy A/ N-Methyl piperazine | 1.4/1 | 4 | 72–75 | 5 | 60 | 1 |
|  | 2/1 | 4 | 90–100 | 9 | 90 | 10 |
| Epoxy B/ N-Methyl piperazine | 1.4/1 | 4 | 109–115 | 16 | 102 | 25 |
|  | 1.5/1 | 4 | 104–107 | 12 | 96 | 30 |
|  | 2/1 | 4 | 110–113 | 12 | 90 | 50 |
| Epoxy C/ N-Methyl piperazine | 1.3/1 | 4 | 116–120 | 18 | 72 | 30 |
| Epoxy B/ N-(2-Hydroxyethyl) piperazine | 1.5/1 | 4 | 115–120 | 23 | 120 | 40 |
| Epoxy B/ N-Octyl piperazine | 2.4/1 | 6 | 55–60 | 23 | 196 | 4 |
| Epoxy B/ N-Phenyl piperazine | 2.4/1 | 6 | 76–81 | 40 | 420 | 4 |
| Epoxy B/ N-Benzyl piperazine | 1.6/1 | 6 | 82–92 | 37 | 300 | 6 |
| Epoxy B/ N-Methyl homopiperazine | 1.5/1 | 4 | 75–80 | 9 | 95 | 20 |
|  | 1.8/1 | 4 | 77–82 | 7 | 96 | 25 |

TABLE II

| Adduct Epoxy/Amine | Ratio of Epoxy to Secondary Amino Groups | Melting Point (°C.) | Gel Time 120° C. (min.) | Gel Time 160° C. (sec.) | Storage Stability at 50° C. (day) |
|---|---|---|---|---|---|
| Epoxy B/ N-Methyl piperazine | 1.5/1 | 104–107 | 12 | 96 | 30 |
| Epoxy B/ Piperazine (Comparative) | 1.5/1 | 93–98 | 13 | 250 | 4 |
| Epoxy B/ 2-Ethyl-4-methyl imidazole (Comparative) | 1.5/1 | 105–110 | 11 | 120 | 2 |
| Epoxy B/ Piperidine (Comparative) | 1.2/1 | 95–100 | 11 | 114 | 1 |
| Epoxy B/ Morpholine (Comparative) | 1.5/1 | 104–109 | 90 | 390 | 1 |

Epoxy B/N-methyl piperazine adducts were prepared according to the method described in Example I using proportions which provided adducts (i.e. 0.8:1 and 4:1) that fell outside the preferred mole ratio range. Epoxy systems were formulated as in Example I using 100 parts Epoxy A, 8 parts dicyandiamide, and 4 parts adduct; two systems were formulated with variable amounts of adducts which had mole ratios of 1.2:1 and 1.8:1. The gel time and storage stability were determined and compared with those of adducts falling within the preferred mole range. The results are given in Tables III, IV, and V.

TABLE III

| Epoxy B/N-Methyl Piperazine Adducts | | | | |
|---|---|---|---|---|
| Ratio of Epoxy to Secondary Amino Groups | Melting Point (°C.) | Gel Time 120° C. (min.) | Gel Time 160° C. (sec.) | Storage Stability at 50° C. (day) |
| 0.8/1 | 35–39 | 2.5 | 100 | <0.5 |
| 1.4/1 | 109–115 | 16 | 102 | 25 |

TABLE III-continued

Epoxy B/N-Methyl Piperazine Adducts

| Ratio of Epoxy to Secondary Amino Groups | Melting Point (°C.) | Gel Time 120° C. (min.) | Gel Time 160° C. (sec.) | Storage Stability at 50° C. (day) |
|---|---|---|---|---|
| 1.5/1 | 104–107 | 12 | 96 | 30 |
| 2/1 | 110–113 | 12 | 90 | 50 |
| 3/1 | 105–110 | 10 | 175 | 40 |
| 4/1 | 180–190 | 65 | 240 | * |

*The storage stability was not measured; however it is assumed that the adduct would be at least as stable as the others.

TABLE IV

Epoxy B/N-Methyl Piperazine Adduct (epoxy/secondary amino group ratio 1.2/1; melting point 64–67° C.)

| Adduct (part) | Gel Time 120° C. (min.) | Gel Time 160° C. (sec.) | Storage Stability at 50° C. (day) |
|---|---|---|---|
| 1.00 | 8 | 180 | 2 |
| 0.50 | 27 | 295 | 10 |
| 0.25 | >60 | 660 | >20 |

TABLE V

Epoxy B/N-Methyl Piperazine Adduct (epoxy/secondary amino group ratio 1.8/1; melting point 87–92° C.)

| Adduct (part) | Gel Time 120° C. (min.) | Gel Time 160° C. (sec.) |
|---|---|---|
| 0.25 | 40 | 255 |
| 0.10 | >60 | 890 |
| 0.05 | >60 | 1090 |

The results show that the epoxy system which contained the adduct having a mole ratio of 0.8:1 was unstable and had a markedly decreased pot life. The epoxy system which contained the adduct having a mole ratio of 1.2:1 was less stable but had a satisfactory pot life and improved low temperature cure when the adduct was used in lesser amounts. The epoxy systems which contained the adduct having a mole ratio of 1.8:1 showed that amounts greater than 0.25 parts must be used to accelerate both the low temperature and high temperature cure. The adduct which had a mole ratio above the maximum preferred value of 3:1 was not as effective, even when used in the larger amount, at accelerating low temperature cure as shown by the increased gel time at 120° C.

EXAMPLE IV

This example demonstrates the use of the preferred Epoxy B/N-methyl piperazine adduct as a co-curing agent for epoxy systems containing carboxylic acid anhydrides as the curing agents. A typical formulation using 2-ethyl-4-methyl imidazole as the co-curing agent was used for comparison. The formulations were prepared as in Example I and were as follows:

| Formulation | A | B | C | D | E | F |
|---|---|---|---|---|---|---|
|  | (parts) | | | | | |
| Epoxy A | 100 | 100 | 100 | 100 | 100 | 100 |
| 1,2-Cyclohexane dicarboxylic acid anhydride | 73 | | | | 73 | 73 |
| Succinic anhydride | | 48 | | | | |
| Phthalic anhydride | | | 71 | | | |
| Bicyclo-(2.2.1)-heptene-2,3-dicarboxylic anhydride | | | | 78 | | |
| Epoxy B/N-Methyl piperazine (epoxy/secondary amino group ratio 1.8/1; melting point 109–114° C.) | 10 | 10 | 10 | 10 | — | — |
| 2-Ethyl-4-methyl imidazole | — | — | — | — | — | 1 |

The gel time and storage stability were determined; the results are given in Table VI. The systems containing co-curing agents, the Epoxy B/N-methylpiperazine adduct of this invention (Formulations A-D) and the 2-ethyl-4-methyl imidazole used for comparison (Formulation F) showed comparable gel times. However, the system containing the Epoxy B/N-methyl piperazine adduct as co-curing agent showed superior storage stability. Formulation E containing no co-curing agent had not gelled after 1200 seconds nor had it cured after 2 hours, thus demonstrating the accelerating effect of the co-catalysts.

TABLE VI

| Formulation | Gel Time 160° C. (sec.) | Storage Stability at 50° C. (day) |
|---|---|---|
| A | 170 | >30 |
| B | 195 | 3 |
| C | 180 | 3 |
| D | 295 | 9 |
| E (control) | >1200 | >60 |
| F (comparative) | 140 | <0.5 |

EXAMPLE V

This example demonstrates the use of the preferred Epoxy B/N-Methyl piperazine adduct as a co-curing agent for epoxy systems containing dihydrazides as the curing agent. The formulations were prepared as in Example I and were as follows:

| Formulation | G | H | I | J | K | L |
|---|---|---|---|---|---|---|
|  | (parts) | | | | | |
| Epoxy A | 100 | 100 | 100 | 100 | 100 | 100 |
| Azelayl dihydrazide | 30 | 30 | 30 | | | |
| Isophthalyl dihydrazide | | | | 30 | 30 | 30 |
| Epoxy B/N-Methyl piperazine (epoxy/secondary amino group ratio 1.8/1; melting point 87–92° C.) | | 1 | 2 | | 1 | 2 |

The gel time and storage stability were determined; the results are given in Table VII.

TABLE VII

| Formulation | Gel Time 160° C. (sec.) | Storage Stability at 50° C. (day) |
|---|---|---|
| G (Control) | 470 | >30 |
| H | 270 | >30 |
| I | 210 | >30 |
| J (Control) | 930 | >30 |
| K | 185 | 8 |
| L | 120 | 4 |

The results show that the piperazine adduct accelerated the gelling time for epoxy resin systems containing dihydrazides as the curing agent. The storage stability of the systems containing azelayl dihydrazide for the time period elapsed was as good as the control. The storage stability of the system containing isophthalyl dihydrazide was somewhat impaired; however this may be partially overcome by reducing the amount of adduct used while still providing a significantly accelerated gel time.

EXMPLE VI

This example demonstrates the use of unitary epoxy resin systems as adhesives. The systems contained a liquid or solid polyepoxide, i.e. Epon 828 (Epoxy A) or Epon 1001 (Epoxy C), carboxylic acid anhydrides or dicyandiamide as the curing agent, and the preferred Epoxy B/N-methyl piperazine adduct. One of the systems contained a filler.

The systems containing carboxylic acid anhydrides as curing agents are described in Example IV and designated as Formulations A-D. Formulation E was the control and F was the comparative example containing 2-ethyl-4-methyl imidazole as a co-curing agent.

The systems containing dicyandiamide as the curing agent were prepared as in Example I. They are designated Formulations M-P. Formulation M was a liquid system; N was the same system containing a filler; O was a solid system; and P was a control. They were formulated as follows:

| Formulation | M | N | O | P |
|---|---|---|---|---|
| | (parts) | | | |
| Epoxy A | 100 | 100 | — | 100 |
| Epoxy C | — | — | 100 | — |
| Dicyandiamide | 8 | 8 | 8 | 8 |
| Adduct (epoxy/secondary amino group ratio 1.7/1; melting point 100-110° C.) | 6 | 6 | — | — |
| Adduct (epoxy/secondary amino group ratio 1.8/1; melting point 95-101° C.) | — | — | 6 | — |
| Aluminum Powder (<325 mesh) | — | 40 | — | — |

The curing times and tensile shear strength of steel to steel bonds were determined and are given in Table VIII.

TABLE VIII

| Formulation | Cure Time at 150° C. (minutes) | Tensile Shear (lb./in.$^2$) | Strength (kg./cm.$^2$) |
|---|---|---|---|
| A | 10 | 4000 | 281 |
| B | 10 | 4000 | 281 |
| C | 10 | 4100 | 288 |
| D | 10 | 3600 | 253 |
| E (control) | — | — | — |
| F (comparative) | 10 | 3800 | 267 |
| M | 5 | 6100 | 429 |
| N (with filler) | 15 | 5800 | 408 |
| O | 30 | 5300 | 373 |
| P (control) | 240 | 6200 | 436 |

The curing time is defined as the time required to reach full bond strength at a given cure temperature which is not necessarily the temperature at which hardening (gelling) due to crosslinking and/or polymerization will be initiated, but rather the temperature at which complete curing to an infusible, insoluble product is efficient and rapid.

The tensile shear strength was determined using two stainless steel bars, having the dimensions 0.5 in. (1.27 cm.) by 4 in. (10.16 cm.) by 0.13 in. (0.33 cm.). The bars were degreased with methyl ethyl ketone, and a small amount of liquid epoxy composition was applied to the surface of one bar near one edge. The second bar was then pressed against the first to form an adhesive film such that there was a 0.25 in. (0.64 cm.) overlap for each bar and hence a bonding area of 0.125 in.$^2$ (0.32 cm.$^2$) The bars were clamped together by means of a spring clip and allowed to cure at a moderately elevated temperature for the time required to reach full cure (maximum tensile shear strength). The bond strength, measured as tensile shear strength, was determined by pulling the bars apart with an Instron Tensile Tester at a crosshead operation speed of 0.1 in./min. (0.25 cm./min.). The values given were the average of five determinations.

The results show the accelerating effect of the piperazine adduct. Comparable bonding occurred.

Summarizing, this invention is seen to provide novel adducts of N-substituted piperazine or N-substituted homopiperazine with polyepoxides. The adducts are useful as co-curing agents for epoxy resin systems containing a known curing agent such as dicyandiamide or a carboxylic acid anhydride.

Now that the preferred embodiments of the present invention have been described in detail, various modifications and improvements thereon will become apparent to those skilled in the art. Accordingly, the spirit and scope of the invention are to be limited only by the appended claims and not by the foregoing specification.

We claim:

1. A unitary, storable, heat-curable epoxy resin system, which comprises a polyepoxide and a curing amount of a combination comprising (1) an epoxy curing agent and (2) a co-curing agent prepared by reacting (a) a polyepoxide with (b) a N-substituted piperazine or a N-substituted homopiperazine, wherein said piperazine is substituted with an alkyl, substituted alkyl, cycloalkyl, aryl or aralkyl group of up to 12 carbon atoms and said homopiperazine is substituted with an alkyl group of up to 3 carbon atoms, said co-curing agent having a ratio of epoxy groups to secondary amino groups of at least 0.8:1.

2. The system of claim 1, wherein said polyepoxides are aromatic polyepoxides and said co-curing agent has a mole ratio of epoxy groups to secondary amino groups of between 1.2:1 and 3:1.

3. The system of claim 2, wherein said polyepoxides are glycidyl polyethers of 4,4'-isopropylidenediphenol having an epoxide equivalent weight of from 175 to 4000.

4. The system of claim 1, wherein said epoxy curing agent is dicyandiamide.

5. The system of claim 1, wherein said epoxy curing agent is a carboxylic acid ahydride.

6. The system of claim 5, wherein said carboxylic acid anhydride is 1,2-cyclohexane dicarboxylic acid anhydride, succinic anhydride, phthalic anhydride, or bicyclo(2.2.1)-heptene-2,3-dicarboxylic anhydride.

7. The system of claim 1, wherein said epoxy curing agent is a dihydrazide.

8. The system of claim 7, wherein said dihydrazide is azelayl dihydrazide or isophthalyl dihydrazide.

9. The system of claim 1, wherein said co-curing agent is prepared from a glycidyl polyether of 4,4'-isopropylidenediphenol having an epoxide equivalent of from 175 to 600 and and a compound selected from the group consisting of N-methyl piperazine, N-(2-hydroxyethyl) piperazine, N-octyl piperazine, N-phenyl piperazine, N-benzyl piperazine, and N-methyl homopiperazine, said co-curing agent being employed in amounts of from 0.05 to 20% by weight, based on said polyepoxide.

10. The system of claim 9, wherein said co-curing agent is employed in amounts of from 0.5 to 10% by weight, based on said polyepoxide.

11. A process for converting a polyepoxide into an insoluble, infusible product, which comprises heating said polyepoxide at an elevated temperature with a curing amount of a combination comprising (1) an epoxy curing agent and (2) a co-curing agent prepared by reacting (a) a polyepoxide with (b) a N-substituted piperazine or a N-substituted hompiperazine, wherein said piperazine is substituted with an alkyl, substituted alkyl, cycloalkyl, aryl or aralkyl group of up to 12 carbon atoms and said homopiperazine is substituted with an alkyl group of up to 3 carbon atoms and said co-curing agent has a ratio of epoxy groups to secondary amino groups of at least 0.8:1, said heating taking place at a temperature above 50° C. for a time sufficient to complete the cure.

12. The process of claim 11, wherein said polyepoxides are glycidyl polyethers of 4,4'-isopropylidenediphenol having an epoxide equivalent of from 175 to 4000.

13. The process of claim 11, wherein said epoxy curing agent is dicyandiamide.

14. The process of claim 11, wherein said epoxy curing agent is a carboxylic acid anhydride selected from the group consisting of 1,2-cyclohexane dicarboxylic acid anhydride, succinic anhydride, phthalic anhydride, and bicyclo (2.2.1)-heptene-2,3-dicarboxylic anhydride.

15. The process of claim 11, wherein said epoxy curing agent is a dihydrazide selected from the group consisting of azelayl dihydrazide and isophthalyl dihydrazide.

16. The process of claim 11, wherein said co-curing agent is prepared from a glycidyl polyether of 4,4'-isopropylidenediphenol having an epoxide equivalent of from 175 to 600 and a compound selected from the group consisting of N-methyl piperazine, N-(2-hydroxyethyl) piperazine, N-octyl piperazine, N-phenyl piperazine, N-benzyl piperazine, and N-methyl homopiperazine, said co-curing agent has a mole ratio of epoxy groups to secondary amino groups of between 1.2:1 and 1:3, and said co-curing agent is employed in amounts of from 0.05 to 20%, based on said polyepoxide.

17. The process of claim 16, wherein said co-curing agent is employed in amounts of from 0.5 to 10%, based on said polyepoxide.

18. A process for making a thermoset article of manufacture using a heat-curable epoxy resin adhesive comprising a polyepoxide, an epoxy curing agent, and a co-curing agent prepared by reacting (a) a polyepoxide with (b) a N-substituted piperazine or a N-substituted homopiperazine, wherein said piperazine is substituted with an alkyl, substituted alkyl, cycloalkyl, aryl or aralkyl group of up to 12 carbon atoms and said homopiperazine is substituted with an alkyl group of up to 3 carbon atoms, said co-curing agent having a ratio of epoxy groups to secondary amino groups of at least 0.8:1.

19. The process of claim 18, wherein said polyepoxide is a glycidyl polyether of 4,4'-isopropylidenediphenol having an epoxide equivalent of from 175 to 4000; said epoxy curing agent is selected from the group consisting of dicyandiamide, 1,2-cyclohexane dicarboxylic acid anhydride, succinic anhydride, phthalic anhydride, and bicyclo (2.2.1)-heptene-2,3-dicarboxylic anhydride; and said co-curing agent is prepared from a glycidyl polyether of 4,4'-isopropylidenediphenol having an epoxide equivalent of from 175 to 600 and a compound selected from the group consisting of N-methyl piperazine, N-(2-hydroxyethyl)-piperazine, N-octyl piperazine, N-phenyl piperazine, N-benzyl piperazine, and N-methyl homopiperazine and said co-curing agent has a mole ratio of epoxy groups to secondary amino groups of between 1.2:1 and 3:1.

20. A composition of matter, useful as a co-curing agent for polyepoxides, which comprises the reaction product of a glycidyl polyether of 4,4'-isopropylidenediphenol having an epoxide equivalent of from 175 to 600 with a N-substituted piperazine or a N-substituted homopiperazine, wherein said piperazine is substituted with an alkyl, substituted alkyl, cycloalkyl, aryl, or aralkyl group of up to 12 carbon atoms and said homopiperazine is substituted with an alkyl group of up to 3 carbon atoms, wherein said reaction product has a mole ratio of epoxy groups to secondary amino groups of between 0.8:1 and 4:1.

21. The composition of matter of claim 20, wherein said piperazine is N-methyl piperazine, N-(2-hydroxyethyl) piperazine, N-octyl piperazine, N-phenyl piperazine or N-benzyl piperazine and said homopiperazine is N-methyl homopiperazine.

22. The process for preparing the composition of claim 20, which comprises mixing said glycidyl polyether with said N-substituted piperazine or said N-substituted homopiperazine.

* * * * *